(12) United States Patent
Soyer et al.

(10) Patent No.: US 10,893,311 B2
(45) Date of Patent: Jan. 12, 2021

(54) METHOD OF CONTROLLING A SYNCHRONIZATION SERVER, AND EQUIPMENT FOR PERFORMING THE METHOD

(71) Applicant: ORANGE, Paris (FR)

(72) Inventors: Emmanuel Soyer, Issy les Moulineaux (FR); Muriele Le Bihan, Amanlis (FR); Yves Acket, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/024,069

(22) Filed: Jun. 29, 2018

(65) Prior Publication Data
US 2019/0007717 A1   Jan. 3, 2019

(30) Foreign Application Priority Data

Jun. 30, 2017 (FR) ..................................... 17 56096

(51) Int. Cl.
*H04N 21/242* (2011.01)
*H04N 21/8547* (2011.01)
*H04N 21/2387* (2011.01)
*H04N 21/43* (2011.01)
(Continued)

(52) U.S. Cl.
CPC ......... *H04N 21/242* (2013.01); *H04N 21/222* (2013.01); *H04N 21/2387* (2013.01);
(Continued)

(58) Field of Classification Search
CPC ............. H04N 21/242; H04N 21/2387; H04N 21/4302; H04N 21/4383; H04N 21/8547
See application file for complete search history.

(56) References Cited

U.S. PATENT DOCUMENTS

2005/0062935 A1   3/2005  Bubie et al.
2007/0101359 A1*  5/2007  Schiller ............... H04H 20/103
                                                              725/33
(Continued)

FOREIGN PATENT DOCUMENTS

FR            2925800 A1      6/2009

OTHER PUBLICATIONS

French Search Report dated Feb. 19, 2018, for corresponding French Application No. 1756096, filed Jun. 30, 2017.
(Continued)

*Primary Examiner* — Alfonso Castro
(74) *Attorney, Agent, or Firm* — David D. Brush; Westman, Champlin & Koehler, P.A.

(57) ABSTRACT

A method of synchronization control in a synchronization gateway equipment is proposed. The method includes: receiving first metadata relating to a first audiovisual content, the metadata having an audiovisual content identifier, a first TV broadcast channel identifier, and time-and-date information; obtaining an identifier of a user interactivity element from the audiovisual content identifier; obtaining time-and-date information for presentation of a user interactivity element from the received time-and-date information; and transmitting, in synchronized manner with the time-and-date information for presentation of the interactivity element, a request for presentation of the user interactivity element corresponding to the identifier of the user interactivity element, the request including the identifier of the user interactivity element.

8 Claims, 3 Drawing Sheets

(51) Int. Cl.
*H04N 21/438* (2011.01)
*H04N 21/81* (2011.01)
*H04N 21/6332* (2011.01)
*H04N 21/222* (2011.01)

(52) U.S. Cl.
CPC ..... *H04N 21/4302* (2013.01); *H04N 21/4307* (2013.01); *H04N 21/4383* (2013.01); *H04N 21/6332* (2013.01); *H04N 21/812* (2013.01); *H04N 21/8173* (2013.01); *H04N 21/8547* (2013.01)

(56) References Cited

U.S. PATENT DOCUMENTS

| | | |
|---|---|---|
| 2011/0016170 A1 | 1/2011 | Gouesbet et al. |
| 2011/0110515 A1* | 5/2011 | Tidwell ............ H04N 21/23109 380/200 |
| 2012/0117584 A1* | 5/2012 | Gordon ................ H04N 21/254 725/19 |
| 2013/0014136 A1 | 1/2013 | Bhatia et al. |
| 2016/0073176 A1* | 3/2016 | Phillips .............. H04N 21/2402 725/35 |
| 2016/0173961 A1* | 6/2016 | Coan ................ H04N 21/44016 725/32 |
| 2016/0182966 A1* | 6/2016 | Hao ..................... H04N 21/235 725/116 |

OTHER PUBLICATIONS

European Search Report dated Feb. 20, 2019 for corresponding European Application No. 18180877.5.

* cited by examiner

METHOD OF CONTROLLING A SYNCHRONIZATION SERVER, AND EQUIPMENT FOR PERFORMING THE METHOD

CROSS-REFERENCE TO RELATED APPLICATIONS

This Application claims priority to and the benefit of French Patent Application No. FR 1756096, filed Jun. 30, 2017, the content of which is incorporated herein by reference in its entirety.

FIELD OF THE DISCLOSURE

The present invention relates to a method of controlling a synchronization server, in particular for playing back a multimedia content, and to a device for performing the method.

BACKGROUND OF THE DISCLOSURE

Audiovisual contents produced by content production control rooms are generally distributed over the air, by satellite, and/or by cable, by transmitting contents to equipment located in the distribution system (e.g. a television decoder or "set-top box" (STB)), by using multicast Internet protocol (IP) technology. For content broadcast to a set-top box, a TV head end (THE) of the network broadcasts data streams to the STB, which data streams contain the audiovisual contents, e.g. in compliance with a digital TV broadcasting standard in the digital video broadcasting (DVB) family of standards.

On receiving a data stream transporting an audiovisual content, the equipment receiving the stream performs processing on the received data (video sequence analysis, decompression, decoding, etc.), and then the audiovisual content is played back to the user by reading video frames of the stream and the associated soundtrack, with display taking place on a screen of a playback device (e.g. a TV set), which may optionally be integrated in the user equipment.

With respect to a multimedia stream of audiovisual type being played back on a playback device, the term "playback" is used herein to mean a displaying at least a video portion of the stream on a screen of the playback device and playing back at least an audio portion of the multimedia stream on one or more loudspeakers of the playback device. By way of alternative, when the multimedia stream is of audio type, e.g. a stream broadcast by a radio station, the playback of the stream comprises only playback of the stream on one or more loudspeakers of the playback device.

Various user interactivity services have been developed in the last few years in order to enable a user viewing an audiovisual content being played back on a playback device to interact with a service by using a predetermined set of actions defined with reference to the context, i.e. the audiovisual content that is being viewed.

The hybrid broadcast broadband TV (HBBTV) standard provides an example of this type of initiative. HBBTV enables television channels to publish additional content together with and accompanying their TV programs. The HBBTV broadcast mode makes it possible to publish additional contents together with the broadcast stream (regardless of whether broadcasting is by digital terrestrial television (DTT), cable, or satellite). A notification on the user's television screen invites the user to access the additional content by pressing on the red button of the remote control. Broadband HBBTV mode is designed for use when the television receiver is connected to the Internet via an Internet access provider.

The provision of interactive services raises the problem of synchronizing the additional contents with the broadcasting of the corresponding main contents. This problem is particularly acute for main contents that are short, as is typical of advertising type contents, which require synchronization that is more accurate because of their shortness. When the main content is of the advertising spot type (of duration that generally does not exceed 30 seconds) and when the second content of the type inviting the user to connect to an Internet site relating to the product being advertised in the spot, it is desirable to ensure that the presentation of the secondary content and the broadcasting of the main content are synchronized to within one second.

Known synchronization methods rely on a technician manually inserting the additional content into the stream transporting the corresponding main content. Such manual manipulations are subject to error, and do not encourage massive development of interactive TV services.

There thus exists a need for a method of synchronizing the presentation of additional content relating to a main audiovisual content with the playback of the main audiovisual content on a device, but without the above-described drawbacks.

SUMMARY

In a first aspect, there is provided a method of controlling synchronization comprising, in a synchronization gateway equipment, receiving first metadata relating to a first audiovisual content, the metadata comprising an audiovisual content identifier, a first TV broadcast channel identifier, and time-and-date information; obtaining an identifier of a user interactivity element from the audiovisual content identifier; obtaining time-and-date information for presentation of a user interactivity element from the received time-and-date information; and transmitting, in synchronized manner with the time-and-date information for presentation of the interactivity element, a request for presentation of the user interactivity element corresponding to the identifier of the user interactivity element, the request including the identifier of the user interactivity element.

In one or more embodiments, the method further comprises obtaining a second TV broadcast channel identifier from the first TV broadcast channel identifier, said second TV broadcast identifier being transmitted in the request for presentation of to user intercativity element.

The proposed method advantageously makes it possible to obtain synchronization that is close (typically to within one second) between the presentation of a user interactivity element and the broadcasting of a corresponding audiovisual content, by determining the synchronization for the presentation of the user interactivity element relative to an event in the broadcasting of audiovisual contents to a playback device of the user.

Furthermore, the proposed method serves advantageously to obtain close synchronization for the presentation of a user interactivity element while automating the control of synchronization, thereby avoiding human errors and facilitating the development of a service of user interactions that are synchronized with any type of audiovisual content broadcast over a content broadcast network.

As a function of the implementation, the received time-and-date information may include a datestamp for broadcasting the first audiovisual contents, or in a variant may include a datestamp requested or desired for presentation of the user interactivity element.

In one or more implementations, the request for presentation of the user interactivity element is transmitted to an audiovisual content broadcast system for presentation of the user interactivity element by displaying a second audiovisual content on a screen of a user's playback device, the second audiovisual content corresponding to the user interactivity element. Under such circumstances, the request for presentation of the user interactivity element may be transmitted to a server for inserting a description element (EIT) of the audiovisual content broadcast system. Also, the request for presentation of the user interactivity element may further include duration information for presentating the user interactivity element by displaying the second audiovisual content on the screen.

In one or more implementations, the request for presentation of the user interactivity element is transmitted to user equipment for presentation of the user interactivity element on a user interface of the user equipment.

In one or more implementations, the proposed method further comprises: receiving second metadata relating to the first audiovisual content, the second metadata including the audiovisual content identifier and second time-and-date information for broadcasting the first audiovisual content, and updating the second time-and-date information for broadcasting the first audiovisual content with the first time-and-date information for broadcasting the first audiovisual content. This serves advantageously to update metadata received by the synchronization gateway, in particular when the time of broadcasting the first audiovisual content has been modified (e.g. in the event of last-minute reprogramming) or when the broadcasting of the content is cancelled.

In one or more implementations, the first time-and-date information for broadcasting the first audiovisual content includes a time and a date for starting broadcasting of the first audiovisual content, and the second time-and-date information for presentation of the user interactivity element corresponds to a time-shifted time and date for starting broadcasting of the first audiovisual content. The use of a time shift serves advantageously to take account of the propagation delay of the synchronization information for an interactivity element up to the display of the interactivity element on a screen. For example, the propagation delay may be compensated by anticipating the sending of requests for presentation of an interactivity element, by triggering the sending of requests N seconds (e.g. 5 seconds) earlier than the time-and-date information received when the time-and-date information is a timestamp for presentation of the user interactivity element.

In a second aspect, there is provided a synchronization gateway device, comprising: a controller comprising a processor, an interface unit comprising an interface unit with a THE subsystem and/or an interface unit with a user equipment notification server, a memory, and a synchronization control unit coupled in operational manner to the controller, and configured to perform a synchronization control method as proposed herein.

Another aspect relates to a computer program, that is loadable into a memory associated with a processor, and that includes code portions for performing a synchronization control method proposed herein when said program is executed by the processor.

Another aspect relates to a dataset representing, e.g. by compression or encoding, a computer program as proposed.

Another aspect provides a non-transient storage medium for a program executable by a computer, the program comprising a dataset representing one or more programs, said one or more programs including instructions that, on execution of said one or more programs by a computer including a processor unit operationally coupled to a memory and to an input/output interface module, cause the computer to control synchronization of the presentation of user interactivity elements by using a synchronization control method as proposed herein.

BRIEF DESCRIPTION OF THE DRAWINGS

Other features and advantages of the present invention appear in the following description of non-limiting examples, given with reference to the accompanying drawings, in which.

DETAILED DESCRIPTION OF ILLUSTRATIVE EMBODIMENTS

In the detailed description below of implementations and embodiments of the invention, numerous specific details are described in order to promote greater understanding. Nevertheless, the person skilled in the art will understand that embodiments and implementations can be put into practice without those specific details. In other situations, characteristics that are well known are not described in detail in order to avoid pointlessly complicating the description.

Figure 1:
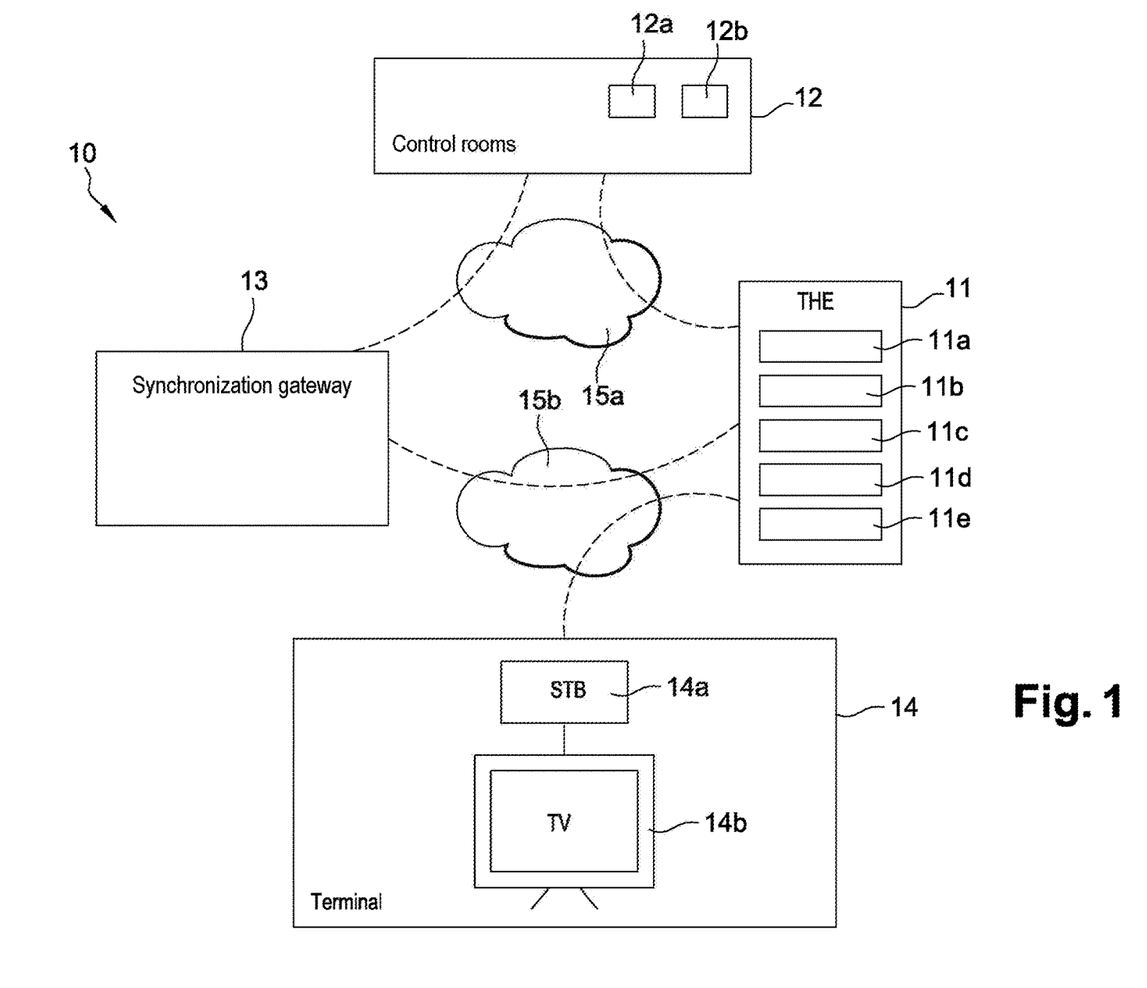
FIG. 1 is a diagram showing the architecture of an audiovisual content broadcast system in one or more embodiments.

FIG. 1 shows the architecture of an audiovisual content broadcast system (10) in one or more embodiments.

In FIG. 1, dashed lines are used by way of illustration and in non-exhaustive manner to indicate the various data communication links that may exist between the nodes of the content broadcast system (10) shown in the figure.

The broadcast system (10) comprises a TV head end (THE) subsystem (11), a control room subsystem (12), a synchronization subsystem (13), and a terminal subsystem (14).

The TV head end (THE), control room, synchronization, and terminal subsystems (11, 12, 13, 14) are interconnected by one or more communications networks (15a, 15b), in particular so as to enable audiovisual contents to be broadcast from the control room subsystem (12) to the terminal subsystem (14).

The control room subsystem (12) may comprise one or more audiovisual content broadcast and/or production control rooms (12a, 12b), e.g. corresponding to respective television channels. In an embodiment, there may also be content production control rooms.

The audiovisual content produced by the control rooms may be broadcast over the air, by satellite, and/or by cable using multicast IP technology, in compliance with a digital TV broadcast standard, e.g. the DVB family of standards.

The TV head end (THE) subsystem (11) is configured to generate and broadcast data streams conveying audiovisual contents supplied by the control road subsystem (12). In one or more embodiments, it comprises a stream control server (11a), insertion server (lib) for inserting an event information table (EIT), one or more video stream encoders (11c), a multiplexing server (11d), and a gateway server (11e). The stream control server (11a) has an interface configured to receive notifications or requests for starting display and it manages insertion of these notifications and requests in the transport stream broadcast towards the terminal subsystem (14).

The EIT is a table contained in the DVB/SI dataset broadcast in the video stream in motion picture expert group (MPEG) format for conveying information about the current TV program (i.e. the audiovisual content that is being broadcast for the television channel in question), information about the TV program following the current program, and private data.

The control room subsystem (12) supplies the THE subsystem (11) with data for audiovisual contents together with metadata describing the audiovisual contents. In one or more embodiments, the metadata comprises an electronic program guide (EPG) giving information about the audiovisual contents. This information may comprise firstly information describing each content, such as a channel identifier, a content identifier, a content title, a content type, a content duration, and also information about the broadcasting of each content, such as a broadcast date, a broadcast time (e.g. in the form of a start-of-broadcast time and a broadcast duration, or a start-of-broadcast time and an end-of-broadcast time).

In one or more embodiments, the control room subsystem (12) is also configured to provide the synchronization subsystem (13) with metadata known as a "playlist" relating to the audiovisual content supplied to the THE subsystem (11). For any one audiovisual content (AVCi) this playlist metadata may comprise an audiovisual content identifier (AVCi_id), a television channel identifier (Channel_Id) on which the audiovisual content (AVCi) is to be broadcast, and time-and-date information concerning the broadcasting of the audiovisual content, such as for example information about the start of content broadcasting, possibly accompanied with information about the duration of broadcasting of the audiovisual content (Start_Time_AVCi, Duration_AVCi).

The terminal subsystem (14) comprises a multimedia gateway (14a) of the TV decoder or "set-top box" (STB) type, or of the TV stick type controlled by an application executed on a user terminal (e.g. a smartphone or a tablet). The multimedia gateway is suitable or receiving data streams transporting audiovisual contents supplied by the THE subsystem (11), for processing it (where the processing of streams typically comprises: video sequence analysis, decompression, decoding as a function of the type of encoding used for the received streams, etc.), and for preparing it after processing for delivery to a playback device (14b), which may be of the TV type, that is connected to the multimedia gateway (14a). In known manner, and by way of example, the network connection means may be of the x-DSL, fiber, or indeed 3G type.

The synchronization subsystem (13) serves advantageously to perform synchronization, e.g. to within one second, between playback on the playback device (14b) of content transported by a data stream broadcast by the THE subsystem (11) and the notification of a user interactivity element (also known as a call to action (CTA)).

In one or more embodiments, the synchronization subsystem (13) may comprise a synchronization gateway that is configured, e.g. by means of application programming interfaces (APIs), to communicate both with the control room subsystem (12) and with the THE subsystem (11).

In one or more embodiments, a user interactivity element may be notified in the form of displaying an interactivity module on the screen of the playback device (14b).

The interactivity module may typically be in the form of an insert displayed on a portion of the screen of the playback device (14b). It may also be designed to enable the user to launch an interactive widget or to receive an event notification on a companion screen (e.g. a screen of user equipment, such as a smartphone or a tablet).

Figure 2:
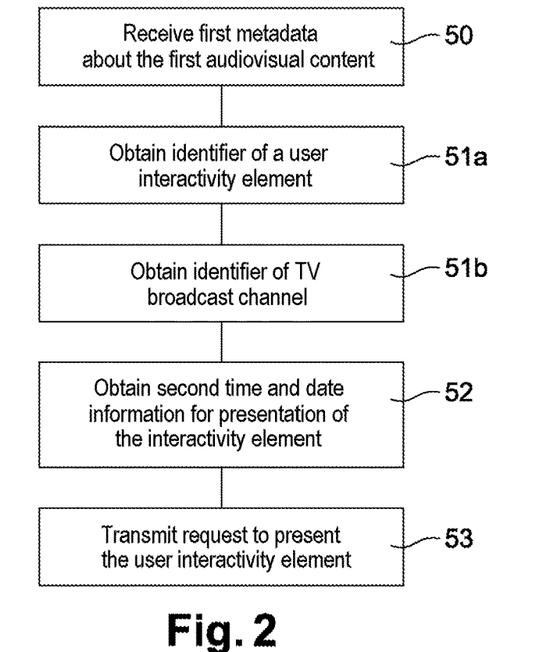
FIG. 2 is a flow chart showing the method proposed in an implementation.

FIG. 2 is a flow chart showing an implementation of the proposed method.

Consideration is given to an audiovisual content broadcast system of the kind shown in FIG. 1.

With reference to FIG. 1, the proposed method may advantageously be performed by a novel functional node, the synchronization gateway (13a), which is suitable for communicating both with the control room subsystem (12) operated by one or more television channels, and also with the THE subsystem (11).

In one or more implementations, the synchronization gateway (13a) receives (50) from the control room subsystem (12) first metadata about a first audiovisual content (AVCi). This metadata comprises an audiovisual content identifier ((AVCi_id), a television channel identifier (Channel_Id) on which the audiovisual content (AVCi) is to be broadcast, and first time-and-date information, which may correspond to the time and date for broadcasting the first audiovisual content (AVCi), or indeed, in a variant, to the time and date requested for presenting a user interactivity element. Depending on the implementation, the items of metadata may be received in one or more messages, i.e. all together or separately.

In general manner, the broadcast control room of a television channel is in charge of preparing the electronic program guide, of constructing the broadcast list, and of broadcasting the TV channels. The program guide contains all of the broadcast information about all of the broadcasts of the day (start time, end time, duration, name, category, . . . ).

In one or more implementations seeking to provide an interactive promotion service, the program guide may be enriched with a unique identifier code for each of the advertisements that is to trigger interactive promotion.

In this context, the proposed method can make use of an audiovisual content identifier of the advertising or publicity identifier (PubID) type as defined by the (French) National Television Publicity Syndicate (French acronym SNPTV). By way of example, the identifier FR_AGEN_ANNO_PROD_0012_030_F is a PubID identifier in which FR is a country code, AGEN is a unique code identifying the advertising agency from which the advertising film originates, ANNO is a unique code identifying the announcer, PROD is the product code given to the product by the agency, 0012 is a unique identifier number of the film for the product PROD, 0030 gives the duration of the film in seconds, and F is a value by default that indicates that the film is a finalized film. The PubID type identifier may be allocated by the service for allocating unique identifiers (PubID) of the French TV advertising interprofessional organization.

In one or more implementations, the metadata is received by the synchronization gateway (13) over an application interface using the hypertext transfer protocol (HTTP) data transfer protocol. The communications interface of the synchronization gateway (13) may also be selected to enable secure data exchanges from and to the control room subsystem (12). For example, the communications interface on a local network 53a may use a communications protocol complying with the hypertext transfer protocol secure (HTTPS), e.g. by using a web socket type secure connection (complying with the WebSocket protocol specification in the request for comments 6455 (RFC6455) of the Internet engineering task force (IETF)).

In one or more implementations, the control room subsystem (12) may send one or more HTTP format requests to the synchronization gateway (13) in order to transmit thereto playlists that correspond to initial playlists, or to updates for playlists that have already been transmitted to the synchronization gateway (13).

An example HTTP request that might be used in one or more implementations is given in Appendix 1 to these presents. In this example, one portion of the metadata, specifically a TV broadcast channel identifier, is incorporated in the universal resource locator (URL) of an HTTP message of the "PUT" type, another portion of the metadata (audiovisual content identifier, time-and-date information about the broadcasting of the audiovisual content) being incorporated in the extended markup language (XML) format within the body of the HTTP message.

Depending on the implementation, the synchronization gateway (13) may receive one or more metadata sets corresponding to respective television channels, or else in a variant a metadata set corresponding to an aggregation of metadata for a plurality of television channels.

Thus, in an implementation corresponding to the example of Appendix 1, a PUT type HTTP request may be sent for the metadata corresponding to a television channel, a channel identifier being provided in the URL field conveyed by the message, with the other metadata transmitted to the synchronization gateway being conveyed in the body of the HTTP message.

In this implementation, the metadata transmitted in the body of the HTTP message may comprise the following elements:

CreationDate: the date the playlist was created by the control room. The synchronization gateway can advantageously use this parameter for managing the way it takes playlists into account; and an element referred to as "Sync", comprising the following events:
AVCi_Id: identifier of the audiovisual content;
Start: display time stamps desired for a user interactivity element; and
Duration: duration of the audiovisual content (e.g. in seconds).

Certain characteristics of these parameters (whether optional or not, type, value format), in one or more implementations for when the first audiovisual content is an advertising spot, are given below.

| Parameter | Optional? | Type | Value |
| --- | --- | --- | --- |
| CreationDate | Yes | Character string | Standard: ISO 8601 |
| AVCi_Id | No | Character string | E.g. using the SNPTV PubID. In a variant, it is possible to use a technical advertising identifier (e.g. PHA25U5G1) |
| Start | Yes | Character string | ISO 8601 time and date. Local time may be used. E.g.: 2016-08-28T09:00:59 |
| Duration | No | Character string | ISO 8601. Content duration. E.g.: PT25S (25 second advertisement). |

The "duration" parameter is optional, and in certain implementations, it could advantageously be used by the synchronization gateway (13) to control synchronization. For example, if the duration of the advertisement is shorter than the duration for displaying the interactivity element, the synchronization gateway (13) does not create or modify a request for presenting the interactivity element and sends an error code.

Appendix 2 of these presents provides an example of a response to an HTTP request that can be used in one or more implementations. For example, the HTTP response header may return a 200 OK HTTP status if the request is successful. If the request is not in compliance, a 400 error may be returned, possibly together with information identifying the error more specifically. If the error is on the server side of the synchronization gateway, then a 500 error may be sent.

By way of example, depending on the implementation, the identified error situations may be as follows:
unknown content identifier: when the referenced content identifier has not been provided on the synchronization gateway (e.g. it is not present in a preconfigured correspondence table matching AVC identifier with interactivity element identifier (CTA));
unknown TV broadcast channel identifier: when the TV broadcast channel identifier has not been provided on the synchronization gateway (e.g. it is not referenced in a preconfigured correspondence table that matches: TV broadcast channel identifier with MD5 fingerprint of the TV broadcast channel identifier); and
Start error: time expired.

In another implementation, the synchronization gateway (13) may receive a metadata set corresponding to an aggregation of metadata for a plurality of television channels. In this implementation, a PUT type HTTP request may be sent for that metadata, with a set of parameters giving channel identifiers, audiovisual content identifiers, and time-and-date information, all being conveyed in the body of the HTTP message.

As mentioned above, in one or more implementations, the metadata received by the synchronization gateway (13) may correspond to the audiovisual contents supplied by the control room subsystem (12) to the THE subsystem (11) of an operator for broadcasting over the operator's audiovisual content distribution network.

The received metadata is then processed in order to obtain firstly (51a), an identifier of a user interactivity element (CTA_id) from the received audiovisual content identifier (AVCi_id), and secondly (51b), a second TV broadcast channel identifier from the first TV broadcast channel identifier.

In one or more implementations, the user interactivity element identifier may be obtained by using a table matching audiovisual content identifiers (AVCi_id) with interactivity element identifiers (CTA_id). This makes it possible in flexible manner to associate audiovisual contents with user interactivity elements, which may in particular have been defined by different entities. Under such circumstances, the correspondence table may be preconfigured in the memory of the synchronization gateway.

By way of example, when the first audiovisual content is an advertising spot, the content may be produced by one of the control rooms of the control room subsystem (12), e.g. the advertising control room of a TV channel. This is different for the user interactivity element, which may have been defined directly by the advertiser in agreement with the telecommunications operator controlling the synchronization gateway, without the television channel being informed about the user interactivity element that corresponds to certain broadcast contents. The operator can thus build a correspondence table matching user interactivity elements that have been defined by the advertiser with corresponding audiovisual content identifiers (advertising spots).

The format selected for the interactivity element identifiers used for performing the proposed method may vary as a function of the implementation. For example, it is possible to use CTA identification nomenclature of the type: "CTA-CH-S-SERVICE-NET-STB", where "CTA" indicates that is a call to action, i.e. a user interactivity element, "CH" identifies a television channel (e.g. its name or acronym), "S" indicates that it is a synchronized user interactivity element, "SERVICE" identifies a service associated with the user interactivity element (e.g. its name or acronym), e.g. the name of a TV game when the interactivity element is associated with that game (e.g. for a viewer vote), and "NET-STB" designates the way in which IPTV is being received (e.g. broadband ADSL, fiber, etc.) and the models of set-top boxes.

The metadata about the audiovisual content enables the operator to know the time for broadcasting the audiovisual content intended by the television channel, or in a variant the time desired by the television channel for presenting the user interactivity element, and the synchronization gateway may be configured to obtain a user interactivity element identifier (CTA_id) corresponding to the audiovisual content that is programmed for broadcasting over the channel identified in the received metadata.

The processing of the received metadata also comprises obtaining a second TV broadcast channel identifier on the basis of the first TV broadcast channel identifier. For this purpose, the synchronization gateway may be preconfigured with a correspondence table matching TV broadcast channel identifiers.

In one or more implementations, the second TV broadcast channel identifier may be in a format different from the first TV broadcast channel identifier. In a particular implementation, this can enable the first TV broadcast channel identifier (in a channel identifier format used by the content broadcast system (11)) to be transposed into a channel identifier format that is usable by the control room subsystem (12) and that is defined in the communications interface between the control room subsystem (12) and the synchronization gateway (13). For example, the second TV broadcast channel identifier may correspond to a Message Digest 5 (MD5) fingerprint of the first TV broadcast channel identifier as precalculated and contained in a correspondence table.

Once the user interactivity element has been identified, time-and-date information for presenting the user interactivity element is obtained (52) on the basis of the first broadcast time-and-date information for the first audiovisual content.

In one or more implementations, the time-and-date information for presenting the user interactivity element may be obtained by generating this information, e.g. by taking the time-and-date information for broadcasting the first audiovisual content as received from the control room subsystem (12). In a variant, a time shift may be introduced, e.g. in order to trigger presentation of the user interactivity element at the start time for broadcasting the first audiovisual content plus a time shift. For an advertising spot of duration that generally does not exceed thirty seconds, this time shift may be of the order of a few seconds. This time shift may also advantageously adjust the broadcast time-and-date information as supplied by the channel using the multicast IP broadcast time and date as controlled by the operator.

Depending on the implementation, the value of the time shift that is applied may be predefined, or it may be determined dynamically, e.g. as a function of the audiovisual content and/or as a function of the user interactivity element. The duration of the audiovisual content (no more than 30 seconds for an advertising spot, or several hours for certain TV games) may be taken into account when determining a time shift value. The presentation duration of the user interactivity element may also be taken into account for determining the value of the applied time shift.

A request to present the user interactivity element corresponding to the user interactivity element identifier is then generated and then transmitted (53) by the synchronization gateway. In one or more implementations, the request comprises the identifier of the user interactivity element, and the second TV broadcast channel identifier. The synchronization gateway manages synchronized transmission of the request as a function of the second time-and-date information for presenting the user interactivity element as obtained beforehand. For example, the transmission of the request may be triggered by the synchronization gateway at an instant that corresponds to the second time-and-date information for presenting the user interactivity element, as obtained beforehand.

In one or more implementations, the interface between the control room subsystem (12) and the synchronization gateway (13a) may be designed to cause the control room subsystem (12) to send metadata relating to an audiovisual content at regular intervals, with the processing of the received metadata including updating the time-and-date information for broadcasting the audiovisual content on the basis of the most recently received metadata about the audiovisual content.

This updating may also be occasional, i.e. not necessarily regular, e.g. for the purpose of accommodating a time shift (typically a delay) in the broadcasting of audiovisual contents by a television channel compared with the initially intended broadcast time, or a change of audiovisual content to be broadcast at a given time.

Under such circumstances, the method may include receiving second metadata about the first audiovisual content, the second metadata including the audiovisual content identifier and second time-and-date information for broadcasting the first audiovisual content, and updating the second time-and-date information for broadcasting the first audiovisual content with the first time-and-date information for broadcasting the first audiovisual content. The second metadata can then be received before the first metadata, and the time-and-date information for broadcasting the audiovisual content contained in the second metadata will be updated on the basis of received time-and-date information for broadcasting the audiovisual content contained in the first metadata.

Also, in order to manage reprogramming (and in particular the almost inevitable time shift in the broadcasting of advertising in the 12:45 and 19:45 time slots), the control room may broadcast a synchronization metadata update in which the time-and-date information associated with content for which broadcasting has been time shifted is modified (e.g. as identified using broadcast channel/identifier parameters). The synchronization gateway may be configured to take account of this updating by updating the time-and-date information in its playlist that is associated with the content that has been reprogrammed (corresponding to the broadcast identifier and channel pair).

In similar manner, in order to manage program cancellation, the control room can broadcast an update for the synchronization metadata in which it deletes the time-and-date information associated with the contents for which broadcasting has been cancelled. The synchronization gateway may be configured to take this update into account by eliminating from its playlist the time-and-date information associated with the cancelled content (corresponding to the broadcast identifier and channel pair).

The proposed method may be performed using software components and/or hardware components. In this context, the terms "module" and "unit" may correspond in this document equally well to a software component or to a hardware component or to a combination of hardware and/or software components, suitable for performing a function or a set of functions, as described for the module or unit in question.

A software component corresponds to one or more computer programs that are executable by a processor, one or more subprograms of a program, or more generally any element of a program or of software. Such a software component is stored in memory and then loaded and executed by a data processor of a physical entity (multimedia gateway, user equipment, terminal, etc.) and it may access the hardware resources of the physical entity (memories, recording media, communications bus, input/output electronic cards, user interfaces, etc.).

In the same manner, a hardware component corresponds to any hardware element or set of hardware elements. It may be a programmable hardware component or a component having an integrated processor for executing software, e.g. an application specific integrated circuit (ASIC), a system on chip (SOC), an integrated circuit (IC) card, an electronic card for executing firmware, etc. SOCs are embedded systems that integrate all of the components of an electronic system on a single chip. An ASIC is a specialized electronic circuit that combines functions bespoke for a given application. ASICs are generally configured on fabrication and a user can only simulate them.

A control method as proposed may also make use of hybrid architectures, such as for example architectures based on a central processor unit (CPU) plus a field programmable gate array (FPGA), or a graphics processing unit (GPU), or a multipurpose processor array (MPPA).

The proposed method may also be implemented in the form of a combination of software and hardware elements, such as for example a software program that is to be loaded by and executed on an FPGA type of programmable logic circuit. FPGAs are electronic circuits that can be reconfigured by the user.

In one or more implementations, the user interactivity element is a second audiovisual content that is to be presented to the user by playback on a user playback device. The second audiovisual content may for example be presented on a user's TV in the form of a insert presented over a portion only of the TV screen. The user may issue a command, e.g. from the TV remote control or from the STB remote control, in order to start execution by the TV of a computer program configured to execute a web browser or to open a web page in the browser corresponding to a preconfigured address in which the user can browse using the remote control.

Under such circumstances, the request for presenting the user interactivity element may be transmitted by the synchronization gateway to the THE subsystem so that the second audiovisual content is inserted in an audiovisual stream transporting the first audiovisual content and broadcast by the THE subsystem, so that it is presented in a manner that is synchronous with the playback of the first audiovisual content.

In one or more implementations, there may be a plurality of user interactivity element identifiers corresponding to the same audiovisual content identifier, and thus a plurality of distinct requests issued to the THE subsystem for the same audiovisual content identifier. This may apply in particular in an implementation in which a distinct user interactivity element identifier is created for each technical broadcast environment (IPTV broadcast by fiber) and each STB model or profile.

When the THE subsystem has an architecture of the type shown in FIG. 1, the request for presentation may be transmitted to the stream control server (11a) of the THE subsystem (11). In a variant, the request for presentation may be transmitted to a server (11b) of the THE subsystem (11) for inserting an EIT.

In an implementation in which the request for presentation is transmitted to the stream control server (11a) of the THE subsystem (11), the request for presentation may be in the form of one or more FTP/XML files, containing the user interactivity element identifier, an identifier for the TV channel corresponding to the audiovisual stream in which the interactivity element is to be inserted, and information about the duration for which the interactivity element is to be presented.

On receiving the request, the stream control server may transmit to the server for inserting EITs a request (e.g. in XML format) to insert information about the synchronized user interactivity elements in the private data of the EIT relating to the audiovisual stream of the TV channel.

The user interactivity element is thus included in an audiovisual stream transmitted to the terminal subsystem (14) shown in FIG. 1. This stream is processed by the multimedia gateway (14a) and then delivered after processing to the playback device (14b) connected to the multimedia gateway (14a). In one or more implementations, the processing performed by the multimedia gateway (14a) includes analyzing the EITs of television channels that might receive user interactivity elements with a given identifier. On detecting a looked-for user interactivity element identifier, the multimedia gateway causes the playback device to display the second audiovisual content corresponding to the detected user interactivity element, the second audiovisual content previously being configured by the multimedia gateway.

In another implementation, additional to or as an alternative to the implementation in which the user interactivity element is a second audiovisual content, the user interactivity element is in the form of a message that is transmitted to user equipment (e.g. a smartphone or a tablet).

When the user equipment has its own display screen, the display screen may be considered as a companion screen for the screen of the playback device on which the first audiovisual content is displayed, possibly with a user interactivity element in the form of a second content.

Figure 3:
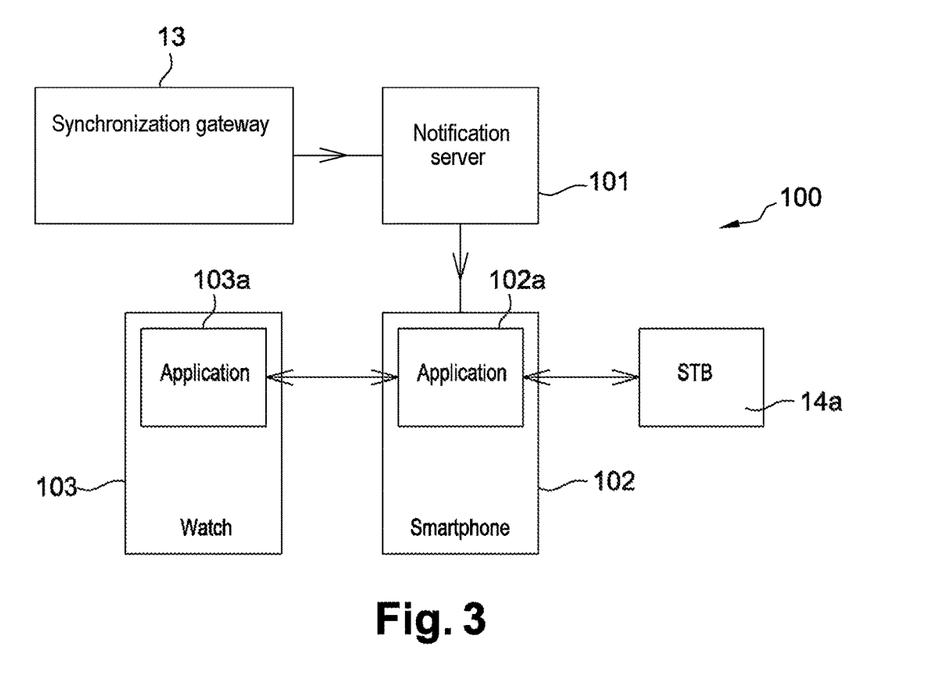
FIG. 3 is a diagram showing the architecture of a notification system for notifying user equipment in one or more embodiments.

Under such circumstances, the request for presenting a user interactivity element is transmitted in a manner that is synchronized with the second time-and-date information, to a notification server for notifying user equipment to deliver a message to user equipment, as shown in FIG. 3.

By way of example, the user interactivity element may then comprise a promotion coupon, i.e. an information element describing a promotion (e.g. a barcode giving access to a discount, a procedure for obtaining a sample, for making a rendezvous, or for giving a remainder about a program (so as to avoid the user missing a program the user seeks to see while it is being broadcast) while broadcasting a promotional trailer on the TV channel, etc.), sent to user equipment by means of a message, e.g. an SMS message.

FIG. 3 shows the architecture of a notification system (100) for notifying user equipment in one or more embodiments of the invention. Elements that are identical to or that correspond to elements shown in FIG. 1 are given the same references.

In FIG. 3, lines are used by way of non-exhaustive illustration to show the various data communications links that may exist between the nodes of the system (100) for notifying user equipment and as shown in the figure.

With reference to FIG. 3, the notification system (100) comprises in one or more embodiments: a synchronization subsystem (13) of the type described above with reference to FIG. 1; a notification server (101) connected to the synchronization subsystem (13); main user equipment (e.g. a smartphone or a tablet) (102); a multimedia gateway (14a); and secondary user equipment (e.g. a connected watch) (103) providing a display offset from the display on the screen of the main user equipment (102).

As described above, the synchronization subsystem may comprise a synchronization gateway (13) configured to communicate via one or more communications networks both with a control room subsystem (12) operated by one or more television channels, and also with a THE subsystem (11).

The main user equipment (102) is adapted to perform a companion application (102a), and typically comprises a screen, e.g. a touch screen, for displaying a graphical user interface (GUI) of the companion application (102a), a microphone for picking up voice commands, and other input interfaces configured as a function of how the companion application (102a) is organized for receiving commands from the user of the application.

In one or more embodiments, the main user equipment (102) comprises a memory, and a processing unit, e.g. having a processor P and controlled by one or more applications, in particular the companion application (102a) dedicated to managing notifications received from the notification server (101), or a computer program, configured to perform one or more implementations of the proposed method.

On initialization, the computer program code instructions may for example be loaded into a random access memory (RAM) prior to being executed by the processor of the processor unit. The processor of the processor unit is configured to perform the control method in accordance with at least one implementation on the basis of the computer program instructions in order to receive notifications and process notifications that have been received.

The main user equipment (102) may be a mobile telephone, e.g. a smartphone, a tablet, a computer, an electronic component, or some other appliance including a communications module, a user interface module (e.g. having a screen, a microphone, a loudspeaker, a keypad), and a processor operationally coupled to a memory, together with other hardware elements, depending on the selected embodiment, such as for example a network interface and a data medium reader for reading a removable storage medium and for writing on such a medium (not shown in the figure). By way of example, the removable storage medium may be a compact disk (CD), a digital video disk (DVD), a flash disk, a USB key, etc. Depending on the embodiment, the memory or the removable storage medium contains instructions that, on being executed by the processor unit, enable the processor unit to receive notifications and process received notifications in at least one of the implementations of the proposed method.

The secondary user equipment (103) may be a watch, an electronic device, an electronic component, or some other appliance including a user interface (such as a display screen, for example), a communications module, and a processor unit having a processor coupled operationally to a memory, together with other associated hardware elements, depending on the selected embodiment, such as for example a network interface and a data medium reader for reading a removable storage medium and for writing on such a medium (not shown in the figure). By way of example, the removable storage medium may be a compact disk (CD), a digital video disk (DVD), a flash disk, a USB key, etc. Depending on the embodiment, the memory or the removable storage medium contains instructions that, on being executed by the processor unit, execute a companion application (103a) of the second user equipment, configured to exchange messages with the companion application (102a) of the main user equipment and to control the user interface in order to present user interactivity elements to the user as received in one or more implementations of the proposed methods.

In the method shown in FIG. 2, and with reference to FIG. 3, the request for presenting the user interactivity element, which includes the user interactivity element identifier and the second TV broadcast channel identifier, can thus be transmitted to the notification server (101).

Using a format for the second TV broadcast channel identifier that is different the format of the first TV broadcast channel identifier received by the synchronization gateway (13) can make it possible, in an implementation, to transpose the first TV broadcast channel identifier to a channel identifier format that can be used by the notification server (101) and that is defined in the communications interface between the notification server (101) and the synchronization gateway (13).

The notification server (101) transits the request to the main user equipment (102), optionally via a notification service server (not shown in the figure) as a function of the type of operating system (e.g. iOS or Android) executed by the main user equipment (102).

In one or more embodiments, the dedicated application (102a) executed on the main user equipment (102) is configured to communicate with the multimedia gateway (14a) of the terminal subsystem (14) via an application programming interface (API), in particular in order to interrogate the multimedia gateway (14a) about the audiovisual content being viewed.

In an embodiment where, in order to obtain an audiovisual stream, the multimedia gateway (14a) subscribes to a multicast broadcast address corresponding to the desired stream, the main user equipment (102) interrogates the multimedia gateway (14a) in order to know which IPTV stream is being received. Knowing which IPTV stream is being viewed makes it possible, e.g. by comparing this information with the data about a broadcast program (e.g. an EPG), to identify the audiovisual content being played back by the playback device (14b) connected to the multimedia gateway (14a). In a variant, the main user equipment (102) interrogates the multimedia gateway (14a) in order to know which television channel is being viewed by the user.

In one or more embodiments, once it has been determined that the audiovisual content being viewed on the playback device (14b) by means of the service gateway (14a) corresponds to first audiovisual content that corresponds to the user interactivity element, or in a variant once it has been determined that the channel being viewed corresponds to the TV broadcast channel identifier contained in the request for presentation received from the notification server (101), the user interactivity element is presented by the dedicated application (102a) of the main user equipment (102) on the user interface, e.g. in the form of a notification addressed to the user of the main user equipment (102), which notification may be an SMS, an email, a voice message, etc.

In contrast, if it is determined that the user interactivity element received from the notification server (101) does not correspond to audiovisual content being viewed via the service gateway (14a), or in a variant if it is determined that the channel being viewed does not correspond to the TV broadcast channel identifier contained in the request for presentation received from the notification server (101), the user interactivity element is not presented by the dedicated application (102a) of the main user equipment (102) on the user interface.

Thus, the user interactivity element is presented to the user only if the user is viewing the audiovisual content that corresponds to the user interactivity element or is viewing the TV channel on which the audiovisual content is broadcast.

In one or more embodiments, when the user interactivity element cannot be presented by the dedicated application (102a) of the main user equipment (102) on the user interface, the dedicated application (102a) of the user equipment may be configured to transmit information about the user interactivity element to the secondary user equipment, e.g. via application interfaces with which the dedicated applications (103a, 102a) can communicate.

On receiving information about the user interactivity element, the dedicated application (103a) of the secondary user equipment may be configured to present the user interactivity element in full or in part to its user.

In this implementation of making a notification to user equipment, the second TV broadcast channel identifier obtained on the basis of the first TV broadcast channel identifier may be identical with the first identifier. In a variant, the first identifier may be transcoded in order to match with a communications interface between the synchronization gateway and the notification server.

Figure 4:
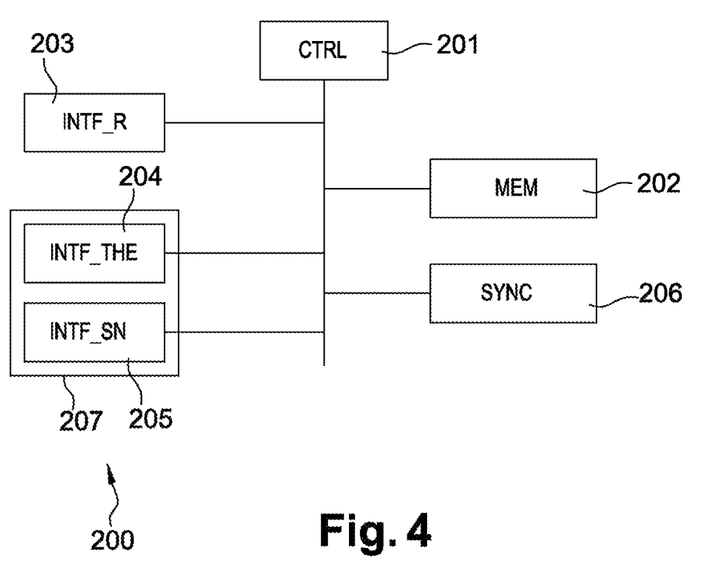
FIG. 4 is a diagram showing a synchronization gateway device in one or more embodiments.

FIG. 4 is a diagram showing a synchronization gateway device synchronized for performing one or more implementations of the proposed method.

With reference to FIG. 4, the synchronization gateway 200 is an electronic device comprising a controller 201, a memory unit 202, a control room subsystem interface unit (INTF_R) 203, a THE subsystem interface unit (INTF_THE) 204, a user equipment notification server interface unit (INTF_SN) 205, and a synchronization control unit (SYNC) 206.

In the architecture shown in FIG. 4, the memory unit 202, the control room subsystem interface unit (INTF_R) 203, the THE subsystem interface unit (INTF_THE) 204, the user equipment notification server interface unit (INTF_SN) 205, and the synchronization control unit (SYNC) 206 are operationally coupled to one another via the controller 201.

The memory unit 202 may have one or more memories of read only memory (ROM) type and of RAM type, including a ROM storing a computer program that is executable by a processor of the controller 201 of the synchronization gateway 200. The memory unit 202 is preferably selected to be suitable for storing a set of user interactivity element identifiers (CTA_id) and a set of metadata about audiovisual contents, e.g. such as playlists as described above, e.g. in a RAM. The memory unit 202 may also be selected to be suitable for storing one or more correspondence tables matching audiovisual content identifiers with user interactivity element identifiers, together with associated presentation time-and-date information.

Depending on the embodiment, the memory(ies) of the memory unit 202 contain(s) computer program instructions that, on being executed by the controller 201, enable the controller 201 to implement or control the portions comprising the control room subsystem interface (INTF_R) 203, the THE subsystem interface (INTF_THE) 204, the user equipment notification server interface (INTF_SN) 205, and the synchronization control (SYNC) 206 of the implementations of the proposed method as described herein.

The control room subsystem interface (INTF_R) 203 may be configured to receive metadata from one or more control rooms for providing audiovisual content, the metadata being about at least one audiovisual content that is to be broadcast, and comprising an audiovisual content identifier, a first television broadcast channel identifier, and time-and-date information, e.g. for broadcasting the audiovisual content or corresponding to a time and date desired for presentation of a user interactivity element. The control room subsystem interface (INFT_R) 203 may also be configured to extract the audiovisual content identifier, the first TV broadcast channel identifier, and the time-and-date information from the received data and to store this data in the memory unit 202. The control room subsystem interface (INTF_R) 203 may thus be configured in one or more embodiments to receive playlists from the broadcast control room, which playlists contain synchronization information, and to aggregate those playlists, since one playlist is typically received from each television channel.

The synchronization control unit (SYNC) 206 may be configured both to obtain firstly an identifier of a user interactivity element from the audiovisual content identifier received by the control room subsystem interface (INTF_R) 203, e.g. by searching in a predefined correspondence table in memory 202, and by associating with the user interactivity element identifier the time-and-date information for broadcasting the audiovisual content corresponding to the user interactivity element, and also to obtain a second TV broadcast channel identifier from the first TV broadcast channel identifier. The synchronization control unit (SYNC) 206 may also be configured to obtain time-and-date information for presenting the user interactivity element on the basis of the time-and-date information for broadcasting the audiovisual content corresponding to the user interactivity element, e.g. by applying a time shift, as described above.

The synchronization control unit (SYNC) 206 may also be configured to start transmission of a request for presentation of the user interactivity element in a manner that is synchronized with the time-and-date information for presentation of the user interactivity element.

The THE subsystem interface unit (INTF_THE) 204 may be configured to transmit a request for presentation of the user interactivity element to an audiovisual content broadcast system.

The user equipment notification server interface unit (INTF_SN) 205 may be configured to transmit a request for presentation of the user interactivity element to a user equipment notification server.

Depending on the embodiment, the synchronization gateway 200 may include a presentation request transmission interface unit 207 including at least one from among the THE subsystem interface unit (INTF_THE) 204 and the user equipment notification server interface unit, or both of these interface units.

The controller 201 is configured to control the units of the synchronization gateway 200, and in particular the synchronization control unit (SYNC) 206. The controller 201 may include a component implementing one or more processors, and it may be controlled by an application or a computer program configured to perform one or more implementations of the proposed method. By way of example, on initialization, the computer program code instructions may be loaded into a RAM of the memory unit 202, prior to being executed by a processor of the controller 201.

The control room subsystem interface unit (INTF_R) 203, the THE subsystem interface unit (INTF_THE) 204, the user equipment notification server interface unit (INTF_SN) 205, and/or the synchronization control unit (SYNC) 206 may be implemented in the form of software (computer programs) that, on being loaded into a memory of the memory unit 202 are executed by a processor of the synchronization gateway 200, performing the synchronization commands using the proposed method. In addition, the control room subsystem interface unit (INTF_R) 203, the THE subsystem interface unit (INTF_THE) 204, the user equipment notification server interface unit (INTF_SN) 205, and/or the synchronization control unit (SYNC) 206, may be implemented in software form, as described above, or in hardware form, such as an application specific integrated circuit (ASIC) or in the form of a combination of hardware and software elements, e.g. such as a software program for loading in and executing by a field programmable gate array (FPGA) type component.

The architecture of the synchronization gateway shown in FIG. 4 is nevertheless not limiting. The synchronization gateway may be a computer or a network of computers, or some other appliance including a processor that is operationally coupled to a memory, together with other associated hardware elements, depending on the selected embodiment, such as a network interface and a data medium reader in order to read a removable storage medium and write on such a medium (not shown in the figure). By way of example, the removable storage medium may be a compact disk (CD), a digital video disk (DVD), a flash disk, a USB key, etc.

In operation of the selected implementation, certain acts, actions, events, or functions of each of the methods described herein may be carried out or occur in an order that is different from that in which they are described above, or they may be added, combined, or not performed or not occur, as the case may be. In addition, in certain implementations, certain acts, actions, or events are undertaken or take place concurrently and not in succession.

An exemplary embodiment of the present application provides a method that is improved, in particular in that it is automated, for synchronizing the presentation of additional content relating to a main audiovisual content.

Although described by means of a certain number of detailed implementations, the proposed encoding method and the equipment for performing the method cover other variants, modifications, and improvements that will appear in obvious manner to the person skilled in the art, it being understood that these variants, modifications, and improvements come within the ambit of the invention as defined by the following claims. Furthermore, various aspects and characteristics that are described above may be used together or separately, or indeed may take the places of one another, and all of those various combinations and sub-combinations of aspects and characteristics come within the ambit of the invention. In addition, it may be that some of the equipment and systems described above do not incorporate all of the modules and functions described for the preferred embodiments.

Appendix 1: Example of HTTP request format received by the synchronization gateway:
HTTP method: "PUT" for playlist creation and updating.
HTTP header: Typical-content: specifies the data format used for requests: application/xml
URL:
The first portion is the host to be used: http://@IP:@port
The second portion identifies the API and its version: e.g.: /api/v1/playlist
The third portion identifies the supplier of the playlist: name of the control room sourcing the playlist associated with a unique identifier for each control room. E.g.: control_room_CH2_$093
The fourth portion identifies the TV channel to which the playlist relates: E.g.: CH2_NEWS
Example URL:
[host]/api/v1/playlist/control_room_CH2_$093/CH2_NEWS
Body of the HTTP message: The body of the message contains the list of the Sync inputs in XML format.

```
xsd file associated with the body of the message:
<?xml version="1.0" encoding="UTF-8"?>
<xs:schema xmlns:xs="http://www.w3.org/2001/XMLSchema"
elementFormDefault="qualified">
  <xs:element name="Playlist">
    <xs:complexType>
    <xs:sequence>
      <xs:element name="CreationDate" type="xs:dateTime"
minOccurs="0" maxOccurs="1"/>
       <xs:element ref="Events"/>
    </xs:sequence>
    <xs:complexType>
  </xs:element>
  <xs:element name="Events">
    <xs:complexType>
     <xs:sequence>
       <xs:element ref="Event" maxOccurs="unbounded"/>
     </xs:sequence>
    <xs:complexType>
  </xs:element>
  <xs:element name="Event">
    <xs:complexType>
     <xs:sequence>
       <xs:element name="PubId" type="xs:string" minOccurs="1"
maxOccurs="1"/>
        <xs:element name="StartTime" type="xs:dateTime"
minOccurs="1" maxOccurs="1"/>
       <xs:element name="Duration" type="xs:duration"
minOccurs="0" maxOccurs="1"/>
     </xs:sequence>
    <xs:complexType>
  </xs:element>
</xs:schema>
```

Example message body:
```
<?xml version="1.0" encoding="UTF-8"?>
<Playlist>
    <CreationDate>2016-11-20T16:17:31</CreationDate>
    <Events>
    <Event>
    <PubId>FR_AGEN_ANNO_PROD_0012_030_F</PubId>
    <StartTime>2016-11-20T16:17:31</StartTime>
    <Duration>PT30S</Duration>
    </Event>
    <Event>
    <PubId>FR_AGEN_ANNO_PROD_0015_025_F</PubId>
    <StartTime>2016-11-20T16:55:31</StartTime>
    <Duration>PT25S</Duration>
    </Event>
    <Event>
    <PubId>FR_AGEN_ANNO_PROD_0015_025_F</PubId>
    <StartTime>2016-11-20T17:25:31</StartTime>
    <Duration>PT25S</Duration>
    </Event>
    </Events>
</Playlist>
```

Appendix 2: Example of format of response to HTTP request transmitted by the synchronization gateway: XML object with the following data:

If no error has occurred, an XML object is returned with the results of the call. (typically the updated playlist)

If an error has occurred, and XML object describing the error is returned.

Example 1:
```
<?xml version="1.0" encoding="UTF-8"?>
    <error>
        <message>Non-conforming XML request</message>
<status>400</status>
</error>
Example 2:
<?xml version="1.0" encoding="UTF-8"?>
<error>
    <message>Unkown identifiers or wrong values in
request</message>
    <status>400</status>
    <wrongPubIds>
        <PubId>FR_AGEN_ANNO_PROD_0015_025_F</PubId>
        <PubId>FR_AGEN_ANNO_PROD_0015_027_F</PubId>
    </wrongPubIds>
    <unknownChannels>
        <channel>PARIS.PREMI</channel>
        <channel>PARIS.PREMIER</channel>
    </unknownChannels>
    <wrongStartTimes>
        <StartTime>2016-11-20T17:25:31</StartTime>
        <StartTime>2016-11-20T19:25:31</StartTime>
    </wrongStartTimes>
</error>
xsd file associated in the event of an error:
<?xml version="1.0" encoding="UTF-8"?>
<xs:schema xmlns:xs="http://www.w3.org/2001/XMLSchema"
elementFormDefault="qualified">
    <xs:element name="error">
    <xs:complexType>
    <xs:sequence>
        <xs:element name="message" type="xs:string"/>
        <xs:element name="status" type="xs:string"/>
        <xs:element ref="wrongPubIds" minOccurs="0"
maxOccurs="1"/>
        <xs:element ref="unknownChannels" minOccurs="0"
maxOccurs="1"/>
        <xs:element ref="wrongStartTimes" minOccurs="0"
maxOccurs="1"/>
    </xs:sequence>
    <xs:complexType>
</xs:element>
    <xs:element name="wrongPubIds">
    <xs:complexType>
    <xs:sequence>
        <xs:element name="PubId" type="xs:string"
maxOccurs="unbounded"/>
    </xs:sequence>
    <xs:complexType>
</xs:element>
    <xs:element name="unknownChannels">
    <xs:complexType>
    <xs:sequence>
        <xs:element name="channel" type="xs:string"
maxOccurs="unbounded"/>
    </xs:sequence>
    <xs:complexType>
</xs:element>
    <xs:element name="wrongStartTimes">
    <xs:complexType>
    <xs:sequence>
        <xs:element name="StartTime" type="xs:dateTime"
maxOccurs="unbounded"/>
    </xs:sequence>
    <xs:complexType>
</xs:element>
</xs:schema>
```

The invention claimed is:

1. A synchronization control method performed by a synchronization gateway, the synchronization gateway forming part of a system including a control room subsystem operated for one or more television channels, a television (TV) head end subsystem, and the synchronization gateway, wherein the TV head end subsystem is configured to receive first audiovisual content and metadata from the control room subsystem and to convey the first audiovisual content in an audiovisual stream to a terminal subsystem, and wherein the method comprises:

receiving first metadata from the control room subsystem, the first metadata relating to the first audiovisual content and comprising an audiovisual content identifier, a first TV broadcast channel identifier, and time-and-date information of the first audiovisual content;

obtaining an identifier of a user interactivity element from the audiovisual content identifier by searching a memory that associates the first audiovisual content with the identifier of the user interactivity element;

determining time-and-date information for presentation of the user interactivity element on a screen of a playback device of the terminal subsystem based on the received time-and-date information of the first audiovisual content and a duration of the first audiovisual content and/or of the user interactivity element such that the user interactivity element is presented synchronously with the first audiovisual content on the screen of the playback device; and transmitting to the TV head end subsystem a request for presentation of the user interactivity element, the request including the identifier of the user interactivity element, said transmitting comprising triggering transmission of the request for presentation at a time instant configured such that said user interactivity element is received by the terminal subsystem in the audiovisual stream from the TV head end subsystem and is displayed on the screen of the playback device of said terminal subsystem in the form of an interactivity module at the time and date indicated in said time-and-date information for presentation of the user interactivity element, wherein said received time-and-date information includes a datestamp for broadcasting the first audiovisual content, or a datestamp requested or desired for presentation of the user interactivity element, and wherein said time-and-date information for presentation of the user interactivity element corresponds to a time-shifted time and date for starting broadcasting of the first audiovisual content, wherein a time shift of said time-shifted time and date information accounts for a propagation delay of said user interactivity element up to the display of the interactivity element on the screen.

2. The method according to claim 1, wherein the request for presentation of the user interactivity element is transmitted to an audiovisual content broadcast system of the TV head end subsystem for presentation of the user interactivity element by displaying a second audiovisual content on the screen of the playback device, the second audiovisual content corresponding to the user interactivity element.

3. The method according to claim 2, wherein the request for presentation of the user interactivity element is transmitted to a server of the TV head end subsystem for inserting a description element of the audiovisual content broadcast system.

4. The method according to claim 2, wherein the request for presentation of the user interactivity element further includes duration information for presenting the user interactivity element by displaying the second audiovisual content on the screen.

5. The method according to claim 1, further comprising: receiving second metadata relating to the first audiovisual content, the second metadata including the audiovisual content identifier and second time-and-date information for broadcasting the first audiovisual content, and updating the second time-and-date information for broadcasting the first audiovisual content with the first time-and-date information for broadcasting the first audiovisual content.

6. The method according to claim 1 further comprising obtaining a second TV broadcast channel identifier from the first TV broadcast channel identifier, said second TV broadcast identifier being transmitted in the request for presentation of the user intercativity element.

7. A synchronization gateway, forming part of a system including a control room subsystem operated for one or more television channels, a television (TV) head end subsystem, and the synchronization gateway, wherein the TV head end subsystem is configured to receive first audiovisual content and metadata from the control room subsystem and to convey the first audiovisual content in an audiovisual stream to a terminal subsystem, the synchronization gateway comprising:

a controller comprising a processor,
an interface unit comprising an interface with the TV head end subsystem and/or an interface with a user equipment notification server,
a memory, and
a synchronization control unit coupled in an operational manner to the controller and configured to:
receive first metadata from the control room subsystem, the first metadata relating to the first audiovisual content and comprising an audiovisual content identifier, a first TV broadcast channel identifier, and time-and-date information of the first audiovisual content;
obtain an identifier of a user interactivity element from the audiovisual content identifier by searching the memory, the memory associating the first audiovisual content with the identifier of the user interactivity element;
determine time-and-date information for presentation of the user interactivity element on a screen of a playback device of the terminal subsystem based on the received time and date information of the first audiovisual content and a duration of the first audiovisual content and/or of the user interactivity element such that the user interactivity element is presented synchronously with the first audiovisual content on the screen of the playback device; and
transmit to the TV head end subsystem a request for presentation of the user interactivity element, the request including the identifier of the user interactivity element, said transmitting comprising triggering transmission of the request for presentation at a time instant configured such that said user interactivity element is received by the terminal subsystem in the audiovisual stream from the TV head end subsystem and is displayed on the screen of the playback device of said terminal subsystem in the form of an interactivity module at the time and data indicated in said time-and-date information for presentation of the user interactivity element,
wherein said received time-and-date information includes a datestamp for broadcasting the first audiovisual content, or a datestamp requested or desired for presentation of the user interactivity element, and
wherein said time-and-date information for presentation of the user interactivity element corresponds to a time-shifted time and date for starting broadcasting of the first audiovisual content, wherein a time shift of said time-shifted time and date information accounts for a propagation delay of said user interactivity element up to the display of the interactivity element on the screen.

8. A non-transitory storage medium storing a program executable by a processor of a synchronization gateway forming part of a system including a control room subsystem operated for one or more television channels, a television (TV) head end subsystem, and the synchronization gateway, wherein the TV head end subsystem is configured to receive first audiovisual content and metadata from the control room subsystem and to convey the first audiovisual content in an audiovisual stream to a terminal subsystem, and wherein the program comprises instructions that, when executed by the processor of the synchronization gateway, cause the synchronization gateway to perform a method comprising:
receiving first metadata from the control room subsystem, the first metadata relating to the first audiovisual content and comprising an audiovisual content identifier, a first TV broadcast channel identifier, and time-and-date information of the first audiovisual content;
obtaining an identifier of a user interactivity element from the audiovisual content identifier by searching a memory that associates the first audiovisual content with the identifier of the user interactivity element;
determining time-and-date information for presentation of the user interactivity element on a screen of a playback device of the terminal subsystem based on the received time-and-date information of the first audiovisual content and a duration of the first audiovisual content and/or of the user interactivity element such that the user interactivity element is presented synchronously with the first audiovisual content on the screen of the playback device; and
transmitting to the TV head end subsystem a request for presentation of the user interactivity element, the request including the identifier of the user interactivity element, said transmitting comprising triggering transmission of the request for presentation at a time instant configured such that said user interactivity element is received by the terminal subsystem in the audiovisual stream from the TV head end subsystem and is displayed on the screen of the playback device of said terminal subsystem in the form of an interactivity module at the time and date indicated in said time-and-date information for presentation of the user interactivity element, wherein said received time-and-date information includes a datestamp for broadcasting the first audiovisual content, or a datestamp requested or desired for presentation of the user interactivity element, and wherein said time-and-date information for presentation of the user interactivity element corresponds to a time-shifted time and date for starting broadcasting of the first audiovisual content, wherein a time shift of said time-shifted time and date information accounts for a propagation delay of said user interactivity element up to the display of the interactivity element on the screen.

\* \* \* \* \*